(12) United States Patent
Ngai et al.

(10) Patent No.: US 7,860,527 B2
(45) Date of Patent: Dec. 28, 2010

(54) METHOD AND APPARATUS FOR RECEIVING DATA AND PAGING FROM MULTIPLE WIRELESS COMMUNICATION SYSTEMS

(75) Inventors: Francis Ming-Meng Ngai, Louisville, CO (US); Alex Kuang-Hsuan Tu, San Diego, CA (US); Serguei A. Glazko, San Diego, CA (US); Steven C. Ciccarelli, Ramona, CA (US)

(73) Assignee: QUALCOMM Incorporated, San Diego, CA (US)

( * ) Notice: Subject to any disclaimer, the term of this patent is extended or adjusted under 35 U.S.C. 154(b) by 680 days.

(21) Appl. No.: 11/432,832

(22) Filed: May 11, 2006

(65) Prior Publication Data

US 2006/0281486 A1 Dec. 14, 2006

Related U.S. Application Data

(60) Provisional application No. 60/680,853, filed on May 12, 2005.

(51) Int. Cl.
*H04M 1/00* (2006.01)
*H04W 4/00* (2009.01)
*H04B 1/00* (2006.01)

(52) U.S. Cl. .............. 455/552.1; 455/445; 455/435.2; 455/69

(58) Field of Classification Search .............. 455/552.1, 455/445, 435.2, 69, 60, 449; 370/252, 335, 370/95.3, 18, 110.1, 338, 537, 326, 314, 370/345, 516, 412
See application file for complete search history.

(56) References Cited

U.S. PATENT DOCUMENTS

2003/0048753 A1* 3/2003 Jalali ........................... 370/252
2004/0152429 A1* 8/2004 Haub et al. ................. 455/102
2008/0080634 A1* 4/2008 Kotecha et al. ............. 375/267

* cited by examiner

*Primary Examiner*—Melody Mehrpour
(74) *Attorney, Agent, or Firm*—Howard H. Seo; Kristine U. Ekwueme

(57) ABSTRACT

Techniques for operating two receivers to receive data and paging from two systems are described. A primary receiver is associated with better performance than a secondary receiver under poor RF conditions. The two receivers may be operated in either a hybrid mode in which the primary receiver is used to receive paging or a simultaneous mode in which the second receiver is used to receive paging. One of the modes may be selected for use based on RF conditions, received power, demodulation metrics, and/or other criteria. In one design, a mode is selected based on the received power and one or more thresholds. In another design, the hybrid mode is selected for poor RF conditions and, for good RF conditions, the hybrid or simultaneous mode is selected based on received power.

36 Claims, 7 Drawing Sheets

METHOD AND APPARATUS FOR RECEIVING DATA AND PAGING FROM MULTIPLE WIRELESS COMMUNICATION SYSTEMS

CLAIM OF PRIORITY UNDER 35 U.S.C. §119

The present application for patent claims priority to Provisional Application No. 60/680,853 entitled "Switching algorithm between simultaneous and hybrid mode for HDR traffic and 1x paging" filed May 12, 2005, and assigned to the assignee hereof and hereby expressly incorporated by reference herein.

BACKGROUND

I. Field

The present disclosure relates generally to communication, and more specifically to techniques for receiving data and paging from multiple wireless communication systems.

II. Background

Wireless communication systems are widely deployed to provide various communication services such as voice, packet data, video, broadcast, messaging, and so on. These systems may be multiple-access systems capable of supporting communication for multiple users by sharing the available system resources. Examples of such multiple-access systems include Code Division Multiple Access (CDMA) systems, Time Division Multiple Access (TDMA) systems, and Frequency Division Multiple Access (FDMA) systems. A CDMA system may implement a radio technology such as cdma2000 or Wideband-CDMA (W-CDMA). cdma2000 covers IS-2000, IS-95 and IS-856 standards. A TDMA system may implement a radio technology such as Global System for Mobile Communications (GSM). These various radio technologies and standards are known in the art.

Some wireless communication systems can provide voice and packet data services. One such system is a CDMA2000 1X system (or simply, a 1X system) that implements IS-2000 and/or IS-95. Voice and packet data services have different characteristics and requirements. For example, voice service typically requires a common grade of service (GoS) for all users and further imposes relatively stringent delay requirements. In contrast, packet data service may be able to tolerate different GoS for different users and variable delays. To support both voice and packet data services, the 1X system may first allocate system resources to voice users and then allocate any remaining system resources to packet data users who are able to tolerate longer delays.

Some wireless communication systems are optimized for packet data service. One such system is a CDMA2000 1xEV-DO system (or simply, a 1xEV-DO system) that implements IS-856. A packet data session typically has long periods of silence and sporadic bursts of traffic. The 1xEV-DO system allocates most or all of the system resources to one user at any given moment, thereby greatly increasing the peak data rate for the user being served.

A service provider/network operator may deploy multiple wireless communication systems to provide enhanced services for its subscribers. For example, the service provider may deploy a 1X system to provide voice and packet data services for a large geographic area and may deploy a 1xEV-DO system to provide packet data service for areas where packet data usage is expected to be high. The coverage areas of the two systems typically overlap.

A hybrid terminal may be able to communicate with both 1X and 1xEV-DO systems. The terminal may receive service from one or both systems at any given moment depending on the capabilities of the terminal, the desired service(s), and whether the terminal is within the coverage areas of these systems. In a common operating scenario, the terminal may register with the 1X system and may monitor this system for pages and other messages. The terminal may also establish a data session with the 1xEV-DO system to obtain packet data service. For this scenario, it is desirable to achieve good performance (e.g., high throughput) for the 1xEV-DO system while monitoring the 1X system so that incoming pages will not be missed.

There is therefore a need in the art for techniques to receive data and paging from multiple communication systems.

SUMMARY

Techniques for operating multiple (e.g., two) receivers at a terminal to receive data and paging from multiple (e.g., two) systems in a manner to achieve good performance for all systems are described herein. A first/primary receiver may be associated with better performance than a second/secondary receiver under poor radio frequency (RF) conditions, e.g., when large amplitude undesired signals or jammers are present in an RF input signal. The two receivers may be operated in one of multiple modes. For example, in a first/hybrid mode, the first receiver may be used to receive a first system during designated time intervals (e.g., assigned paging slots for a 1X system). In a second/simultaneous mode, the second receiver may be used to receive the first system during the designated time intervals. For both modes, the first and second receivers may be used to receive a second system when not used to receive the first system. One of the modes may be selected for use based on RF conditions, received power, demodulation metrics, and/or other criteria.

In an embodiment, the terminal determines the RF conditions, received power, and/or one or more demodulation metrics for the first system. The terminal then controls operation of the first and second receivers based on the RF conditions, received power, and/or demodulation metric(s) for the first system. In an embodiment, a mode is selected based on the received power and one or more thresholds. For example, the first mode may be selected for low received power, and the second mode may be selected for high received power, where low and high received powers may be determined by the threshold(s). In another embodiment, a mode is selected based on the RF conditions and received power. For example, the first mode may be selected for poor RF conditions. For good RF conditions, the first or second mode may be selected based on the received power and one or more thresholds. In yet another embodiment, a mode is selected based on the RF conditions, received power, and demodulation metric(s). For example, the first mode may further be selected if the demodulation metric(s) fail. The second mode may further be selected if the RF conditions are unknown, the received power is sufficiently high, and the demodulation metric(s) pass.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The techniques described herein may be used for various wireless communication systems such as cdma2000 systems, UMTS systems that implement W-CDMA, and so on. For clarity, these techniques are specifically described below for a 1X system and a 1xEV-DO system.

Figure 1:
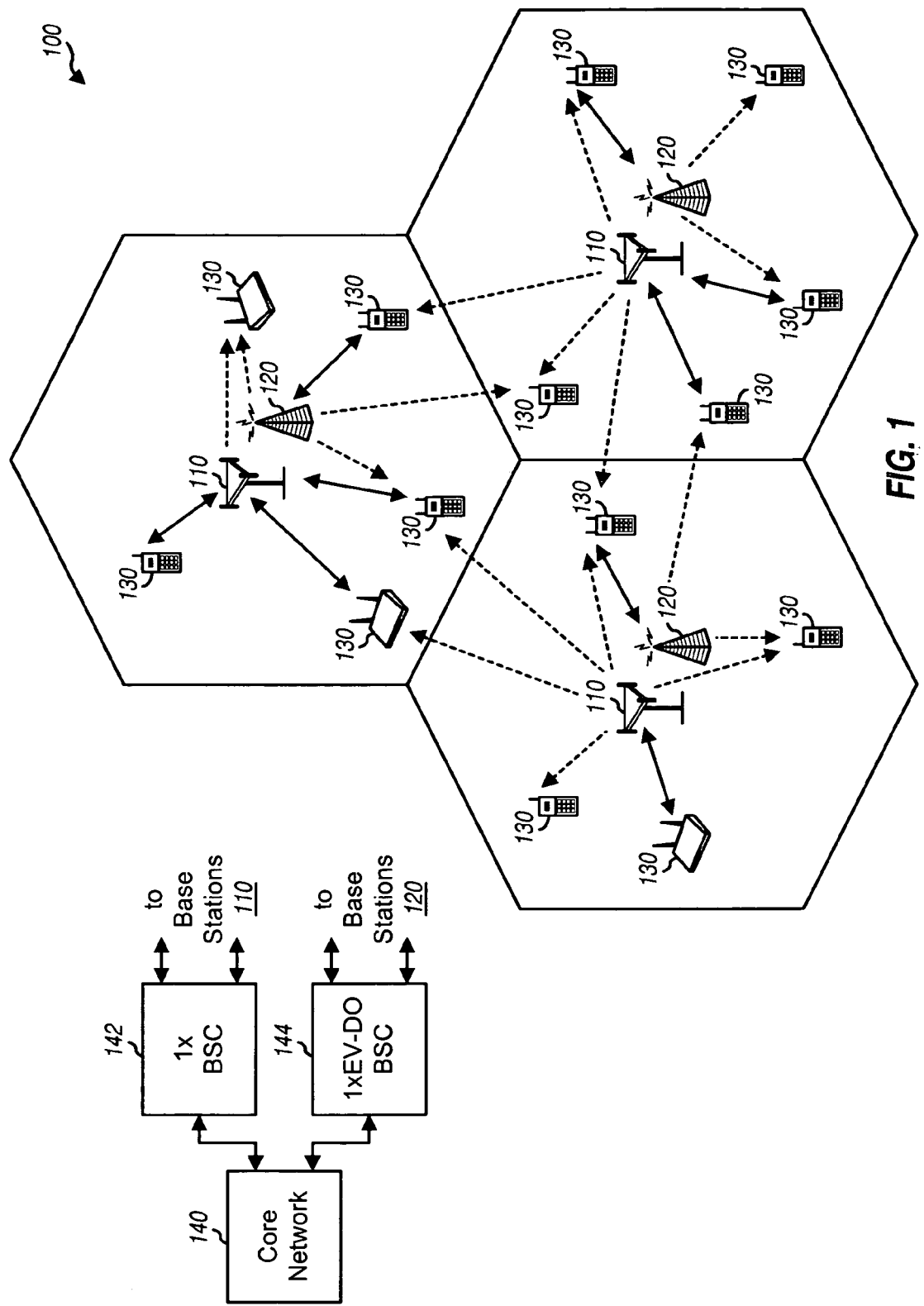
FIG. 1 shows a 1xEV-DO system and a 1X system.

FIG. 1 shows an exemplary deployment 100 in which a 1xEV-DO system overlays a 1X system. The 1X system includes a number of base stations 110 that provide voice and packet data services for terminals 130 located within the coverage area of these base stations. Similarly, the 1xEV-DO system includes a number of base stations 120 that provide packet data service for terminals 130 located within the coverage areas of these base stations. Base stations 110 and 120 may be located at different sites or co-located at the same sites. A base station controller (BSC) 142 couples to base stations 110 and provides coordination and control for these base stations. Similarly, a BSC 144 couples to base stations 120 and provides coordination and control for these base stations. BSCs 142 and 144 may further couple to a core network 140 that supports communication between the 1X and 1xEV-DO systems.

In general, a base station (1X terminology) is a fixed station that communicates with the terminals and may also be called an access point (1xEV-DO terminology), a Node B (UMTS terminology), a base transceiver station (BTS), or some other terminology. A terminal may be fixed or mobile and may also be called a mobile station (1X terminology), an access terminal (1xEV-DO terminology), a user equipment (UMTS terminology), or some other terminology. A terminal may be a wireless device, a cellular phone, a personal digital assistant (PDA), a subscriber unit, a wireless modem, and so on. In the description herein, the term "base station" is used generically for a fixed station, and the term "terminal" is used for a wireless device that communicates with the fixed station. A hybrid terminal is a terminal that can communicate with multiple systems, e.g., the 1X and 1xEV-DO systems.

In FIG. 1, a solid line with arrows on both ends indicates communication between a terminal and a base station. A dashed line with an arrow on one end indicates reception of pilot and/or signaling (e.g., pages) by a terminal from a base station. A terminal may communicate with one or multiple base stations on the forward link and/or reverse link at any given moment. The forward link (or downlink) refers to the communication link from the base stations to the terminals, and the reverse link (or uplink) refers to the communication link from the terminals to the base stations.

A hybrid terminal may register with the 1X system and may operate in an idle state when the terminal is not actively exchanging data with any base station in the 1X system. In the idle state, the terminal typically monitors a paging channel (PCH) from the 1X system for messages applicable to the terminal. Such messages may include page messages that alert the terminal to the presence of an incoming call and overhead messages that carry system and other information for the terminal.

In IS-2000 and IS-95, the paging channel is partitioned into PCH slots. Each PCH slot has a duration of 80 milliseconds (ms). A terminal is assigned one PCH slot in each slot cycle of $T_{SC}$ seconds, which is given as:

$$T_{SC} = 1.28 \times 2^{SCI}, \qquad \text{Eq (1)}$$

where SCI is a slot cycle index that is applicable to the terminal and may be negotiated between the terminal and the 1X system. The SCI can range from −4 to +7, and the slot cycle can range from 80 ms to 163.84 seconds, respectively. Each slot cycle contains $16 \times 2^{SCI}$ PCH slots that are assigned indices of 1 through $16 \times 2^{SCI}$. The terminal is assigned a specific PCH slot index that is determined by an International Mobile Subscriber Identifier (IMSI), an Electronic Serial Number (ESN), or some other identifier for the terminal. The PCH slot index for the terminal is fixed, and each PCH slot with that slot index is called an assigned paging slot. The terminal processes the assigned paging slot in each slot cycle since a message may be sent to the terminal in that paging slot.

Figure 2:
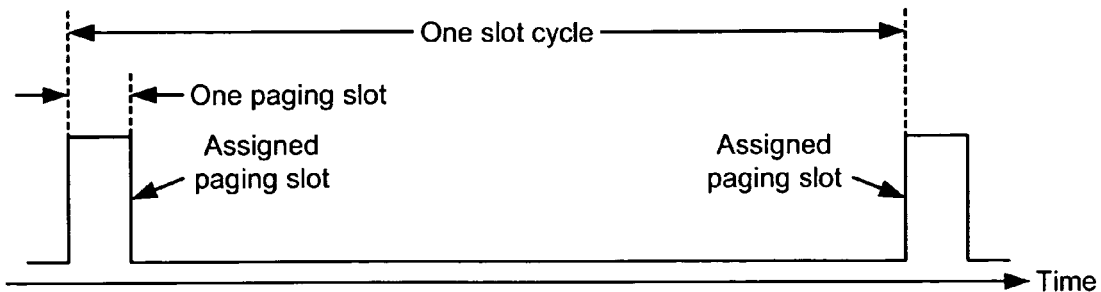
FIG. 2 shows a timeline for processing a paging channel in the 1X system.

FIG. 2 shows a timeline for processing the paging channel by a terminal in the 1X system. The terminal may operate in a slotted mode in which (1) the 1X system sends messages to the terminal only in the assigned paging slots and (2) the terminal monitors the paging channel for messages only during the assigned paging slots. The terminal processes the paging channel for each assigned paging slot and performs other functions to maintain the communication link with the 1X system. The assigned paging slots are separated by $T_{SC}$ seconds.

In IS-2000 and IS-95, a quick paging channel (QPCH) carries indicators that indicate whether messages may be sent on the PCH. A terminal is hashed to a specific indicator prior to each assigned paging slot. The terminal typically processes the QPCH to detect the assigned indicator and further demodulates the PCH only if the assigned indicator indicates that a message might be sent on the PCH for the terminal.

A hybrid terminal may be equipped with a single antenna or multiple antennas that may be used for transmission and reception.

Figure 3A:
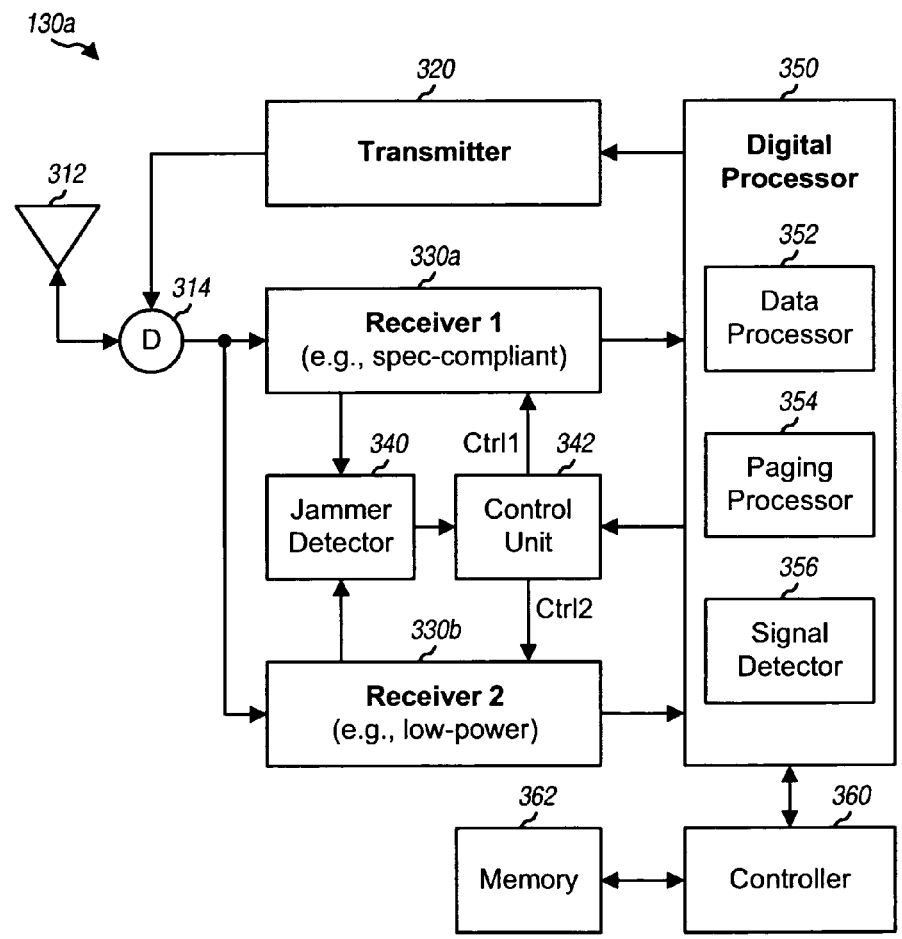
FIG. 3A shows a block diagram of a single-antenna terminal.

FIG. 3A shows a block diagram of an embodiment of a single-antenna terminal 130a. For the transmit portion, a digital processor 350 provides output data to be transmitted to the 1X or 1xEV-DO system. A transmitter 320 conditions (e.g., converts to analog, filters, amplifies, and frequency upconverts) the output data and generates an RF output signal. The RF output signal is routed through a duplexer 314 and transmitted from an antenna 312.

For the receive portion, antenna 312 receives RF modulated signals transmitted by base stations in the 1X and 1xEV-DO systems and provides an RF input signal that includes different versions of the transmitted RF modulated signals. The RF input signal is routed through duplexer 314 and provided to both receivers 330a and 330b. Receiver 330a is designated as the primary receiver, and receiver 330b is designated as the secondary receiver. Each receiver 330 processes the RF input signal for an RF channel of interest and provides a baseband signal. The baseband signals from receivers 330a and 330b are digitized (e.g., by processor 350 or receivers 330a and 330b) to generate data samples. Processor 350 then processes the data samples to obtain decoded data. The processing by processor 350 is dependent on the system being received (e.g., 1X or 1xEV-DO), the type of transmission being received (e.g., data or paging), and possibly other factors.

For the embodiment shown in FIG. 3A, a data processor 352 performs processing (e.g., encoding, modulation, decoding, demodulation, and so on) for data exchanged with the 1xEV-DO system. A paging processor 354 performs processing (e.g., demodulation and decoding) for pages from the 1X system. Each system operates on a specific band class (e.g., cellular or PCS) that includes multiple RF channels, with each RF channel having a bandwidth of 1.23 MHz for 1X and 1xEV-DO. A signal detector 356 measures the received power for each RF channel of interest.

Figure 3B:
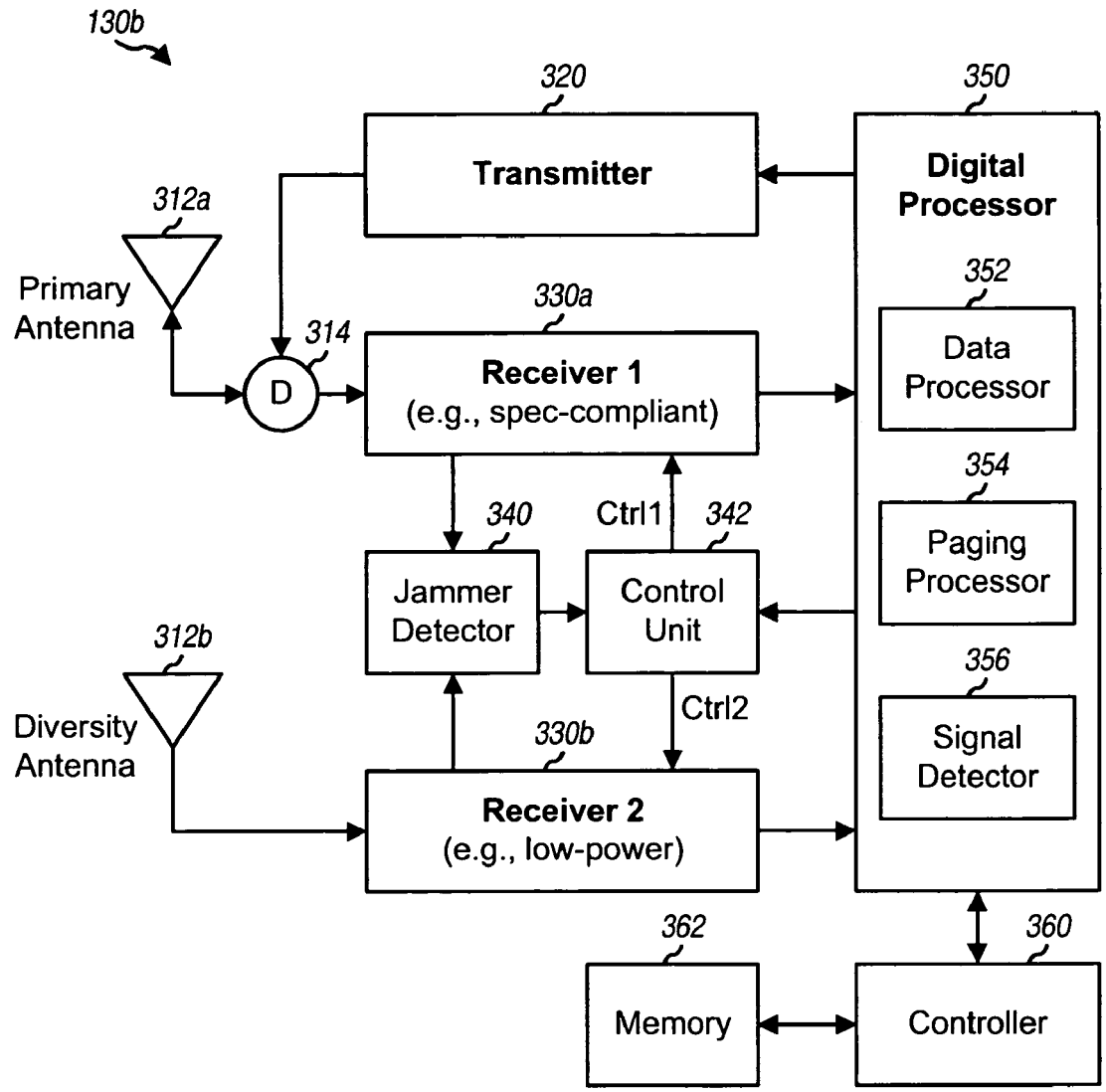
FIG. 3B shows a block diagram of a multi-antenna terminal.

FIG. 3B shows a block diagram of an embodiment of a multi-antenna terminal 130b. For this embodiment, terminal 130b includes two antennas 312a and 312b. Antenna 312a is designated as a primary antenna and is coupled to duplexer 314, which further couples to transmitter 320 and receiver 330a. Antenna 312b is designated as a diversity antenna and is coupled to receiver 330b. In an embodiment, antennas 312a and 312b are implemented with different designs, and antenna 312a has better performance (e.g., higher gain) than antenna 312b. In another embodiment, antennas 312a and 312b are implemented with the same design and have similar performance.

For the embodiments shown in FIGS. 3A and 3B, primary receiver 330a is designed to meet applicable system requirements, and secondary receiver 330b is designed for low power and with less stringent requirements. The system requirements may cover sensitivity, dynamic range, linearity, out-of-band rejection, and so on. In an embodiment, primary receiver 330a can operate in one of multiple linearity states (e.g., low, mid, and high linearity states) at any given moment. The low, mid and high linearity states may provide good performance for good, fair and poor RF conditions, respectively, with low, medium and high power consumption, respectively. In an embodiment, secondary receiver 330b is designed to operate in the low linearity state at all time. For this embodiment, receivers 330a and 330b have similar performance when receiver 330a is operated in the low linearity state. In other embodiments not shown in FIGS. 3A and 3B, both receivers 330a and 330b have similar designs and achieve similar performance, e.g., both receivers are designed to meet system requirements.

For the embodiments shown in FIGS. 3A and 3B, a jammer detector 340 detects for the presence of jammers in the RF input signal and provides a status signal that indicates whether or not jammers are present in the RF input signal. A jammer is a large amplitude undesired signal that is outside of, but close to, an RF channel of interest. Jammer detector 340 may detect for jammers in primary receiver 330a, or secondary receiver 330b, or both receivers. A control unit 342 receives the status signal from jammer detector 340 and pertinent information from processor 350 and generates control signals for receiver 330a and 330b. Each control signal may enable or disable the associated receiver 330. In an embodiment, the control signal for primary receiver 330a may further select (1) a low linearity state for receiver 330a for good RF conditions (e.g., if no jammers are detected and if the received power is above a predetermined threshold) or (2) another linearity state otherwise.

Terminals 130a and 130b may operate in various manners. In one configuration, either receiver 330a or 330b is selected for use at any given moment, depending on the RF conditions. In another configuration, both receivers 330a and 330b are active at the same time and simultaneously process signals for two different systems. In yet another configuration that is applicable for terminal 130b, both receivers 330a and 330b are active at the same time to simultaneously process two RF input signals for the same system to achieve receive/spatial diversity.

A hybrid terminal may include multiple receive paths with different levels of performance, or asymmetric receive paths. Each receive path includes various circuit elements used to receive and process an RF input signal. For the embodiment shown in FIG. 3A, the primary receive path includes antenna 312, duplexer 314, and receiver 330a, and the secondary receive path includes antenna 312, duplexer 314, and receiver 330b. For the embodiment shown in FIG. 3B, the primary receive path includes antenna 312a, duplexer 314, and receiver 330a, and the secondary receive path includes antenna 312b and receiver 330b. The receive paths may have different levels of performance due to the use of different antennas having different gains (e.g., as shown in FIG. 3B) and/or different receivers with different designs and performance characteristics (e.g., as shown in FIGS. 3A and 3B). For example, the sensitivity of secondary receiver 330b may be worse than the sensitivity of primary receiver 330a due to (1) use of an antenna having a lower free-space antenna gain, (2) body loading effects on an internal antenna for the secondary receive path, (3) the secondary receiver being biased with less current, and so on. Sensitivity refers to the lowest signal level that a receiver can correctly demodulate. Body loading effects refer to attenuation of the RF input signal due to the antenna being covered by a user (e.g., a hand covering an internal antenna).

A hybrid terminal may have a data session with the 1xEV-DO system and may receive the paging channel from the 1X system in order to detect incoming calls. The hybrid terminal may operate in one of several modes to receive data and paging from the two systems. Table 1 lists two exemplary modes and a short description for each mode.

TABLE 1

| Mode | Description |
| --- | --- |
| Hybrid Mode | Receive data from the 1xEV-DO system and paging from the 1X system by sharing the primary receiver in a time division multiplexed manner. |
| Simultaneous Mode | Receive data from the 1xEV-DO system using the primary receiver and paging from the 1X system using the secondary receiver. |

Table 2 shows an embodiment of operating receivers 330a and 330b for the hybrid and simultaneous modes. For the hybrid mode, primary receiver 330a may be tuned to the 1X system during the assigned paging slots and to the 1xEV-DO system at other times. Secondary receiver 330b may be tuned to the 1xEV-DO system at all times to provide receive diversity. For the simultaneous mode, primary receiver 330a may be tuned to the 1xEV-DO system at all times. Secondary receiver 330b may be tuned to the 1X system during the assigned paging slots and to the 1xEV-DO system at other times to provide receive diversity.

TABLE 2

| Mode | Primary receiver tuned to . . . | Secondary receiver tuned to . . . |
|---|---|---|
| Hybrid mode | 1X during assigned paging slots and 1xEV-DO at other times | 1xEV-DO at all times |
| Simultaneous mode | 1xEV-DO at all times | 1X during assigned paging slots and 1xEV-DO at other times |

Table 2 shows a specific embodiment of operating the two receivers. These receivers may also be operated in other manners. Furthermore, the operation of the receivers may impact performance of the reverse link. For example, transmitter 320 may be associated with primary receiver 330a in the hybrid mode, and both may be pointed to the same system at any given moment. In this case, when the primary receiver tunes from 1xEV-DO to 1X, in addition to not being able to receive 1xEV-DO data on the forward link, the terminal is also not able to transmit 1xEV-DO data on the reverse link. With the simultaneous mode defined as shown in Table 2, the disadvantage described above goes away since the primary receiver as well as the transmitter are tuned to 1xEV-DO all the time. Hence, the simultaneous mode may have a more significant impact on 1xEV-DO reverse link traffic performance than on forward link traffic performance in some scenarios.

It is desirable to achieve good data performance for the 1xEV-DO system and good paging performance for the 1X system. Data performance is generally better in the simultaneous mode than the hybrid mode since primary receiver 330a is used all the time to receive data from the 1xEV-DO system. However, paging performance may degrade (e.g., the message error rate (MER) for pages may increase) if operating in the simultaneous mode all the time. This is because secondary receiver 330b may provide good paging performance under good RF conditions but may provide degraded paging performance under poor RF conditions. The degradation may be due to secondary receiver 330b having worse sensitivity than primary receiver 330a and/or being coupled to diversity antenna 312b with lower gain than primary antenna 312a. Under poor RF conditions, improved paging performance may be achieved by switching to the hybrid mode and using primary receiver 330a to receive the paging channel during the assigned paging slots.

In general, it is desirable to operate in the simultaneous mode whenever possible and to switch to the hybrid mode whenever needed to ensure good paging performance. An objective is to maximize throughput for the 1xEV-DO system without adversely affecting paging performance for the 1X system. The simultaneous mode may be selected during time intervals in which receivers 330a and 330b can achieve similar paging performance. Otherwise, the hybrid mode may be selected.

The decision to select either the hybrid mode or the simultaneous mode may be made based on various criteria. Table 3 lists some criteria and a short description for each criterion.

TABLE 3

| Mode Selection Criterion | Description |
|---|---|
| RF conditions | Cover everything in an RF input signal that can affect receiver performance, such as the presence of jammers. |
| Desired signal conditions | Cover the desired signal. |
| Demodulation performance | Cover performance after processing at the terminal. |
| Receiver capabilities | Cover the capabilities of/for the primary and secondary receivers, e.g., whether the receivers have similar or different performance and whether jammers can be detected for both receivers or only the primary receiver. |

RF conditions cover the entire spectrum in the RF input signal, which includes both a desired signal for an RF channel of interest and undesired signals that are out of band. In an embodiment that is described below, the RF conditions are quantified as either "poor" or "good". Poor RF conditions may be caused by the presence of jammers in the RF input signal, a weak desired signal level, some other conditions, or a combination thereof. For example, poor RF conditions may be declared if (1) the jammer level exceeds a TH1 threshold or (2) the jammer level exceeds a TH2 threshold and the desired signal level is below a TH3 threshold, where TH2<TH1. The thresholds may be selected based on the performance of the primary and/or secondary receive paths, the desired paging performance, and so on.

For the embodiments shown in FIGS. 3A and 3B, jammer detector 340 can ascertain the RF conditions observed by each of receivers 330a and 330b. For other embodiments, jammer detector 340 may be able to ascertain the RF conditions observed by primary receiver 330a but not secondary receiver 330b. For these other embodiments, the RF conditions observed by secondary receiver 330b may be assumed to be (1) the same as the RF conditions observed by primary receiver 330a if both receivers 330a and 330b are operating in the same band class or (2) unknown if receivers 330a and 330b are operating in different band classes.

The RF conditions observed by primary receiver 330a are determined and used to select one of the linearity states for primary receiver 330a. Hence, poor RF conditions may be indicated by receiver 330a operating in the high linearity state. Primary receiver 330a may provide good paging performance for all RF conditions, albeit in different linearity states for different RF conditions. Secondary receiver 330b may provide good paging performance for good RF conditions and poor paging performance for poor RF conditions.

The desired signal conditions cover the inband desired signal, which is part of the RF conditions. The desired signal conditions for the 1X system may be quantified by various metrics such as, e.g., the total received power for the desired RF channel (Io), the energy-per-bit-to-total-noise ratio (Eb/Nt) for the paging channel in the 1X system, the energy-per-chip-to-total-received-power ratio (Ecp/Io) for a pilot channel in the 1X system, and so on. The total received power (Io) at the terminal may be expressed as:

$$Io = Ioc + Ior + No, \quad \text{Eq (2)}$$

where Ior is the received power for a desired base station,
Ioc is the received power for other base stations, and
No is the thermal noise at the terminal.

Typically, No is a fixed value. Equation (2) takes into account real propagation loss in open space or line of site. In high geometry cases, the terminal is close to the serving base station, and Ior/Ioc is high (e.g., above 4 dB). In low geometry cases, the terminal is on the boundary of two or more cells. Therefore, Ioc (other cell interference) is high compare to Ior (for the serving cell), and Ior/Ioc is low (e.g., 0 dB).

Ioc, Ior, Ecp and Eb are attenuated by the same amount at the terminal due to path loss between the terminal and the desired base station. As the terminal moves further away from the base station, the path loss increases, Io, Ioc, Ior, Ecp and Eb decrease, but Ecp/Io and Eb/Nt remain fairly constant as long as Io>>No. When the path loss is sufficiently high, No becomes comparable to Ioc and Ior. From this point onward, increasing path loss results in Io remaining approximately constant and Ecp/Io and Eb/Nt decreasing linearly with increasing path loss. When Io is too low, Eb/Nt may be too low to enable reliable reception of the paging channel and Ecp/Io may be too low to enable reliable acquisition of the paging channel. Hence, Io may be used as a metric to quantify the desired signal conditions, especially when Ecp/Io and Eb/Nt are not available. Furthermore, Io may also be used as a metric for RF conditions when other measurements are not available. For example, poor RF conditions may be declared if Io is below a Th_low threshold, and good RF conditions may be declared if Io is above a Th_high threshold.

A measurement of the received power (Io) for the 1X system may be made during each assigned paging slot. The Io measurements may be noisy and may be filtered, e.g., with a finite impulse response (FIR) filter or an infinite impulse response (IIR) filter. For example, N Io measurements for N most recent assigned paging slots may be filtered (e.g., averaged) to obtain a filtered Io for the current assigned paging slot. In general, the filtered Io or the unfiltered Io may be used as the received power for the 1X system.

The demodulation performance may be quantified by various metrics for the PCH and/or QPCH. The terminal may process the QPCH in each assigned paging slot and may or may not process the PCH depending on the assigned indicator in the QPCH. For the QPCH, demodulation metrics such as Ecp/Io may be used for mode selection. Ecp/Io may be estimated as a dot product of a filtered pilot with itself, over the duration of one QPCH bit. The dot product may be filtered over several QPCH bits to reduce noise and improve the estimate of Ecp/Io. For the PCH, demodulation metrics such as Eb/Nt, frame energy, symbol error rate, cyclic redundancy check (CRC), and so on may be used for mode selection. Frame energy is the energy collected over a frame received on the PCH. Symbol error rate is equal to the number of symbol errors in a frame divided by the total number of symbols in the frame. The symbol errors may be determined by decoding the received symbols for the frame, re-encoding the decoded frame, and comparing the re-encoded symbols against the received symbols. CRC failure is declared if the frame does not pass a CRC check. In general, any one or any combination of demodulation metrics may be used for mode selection. The demodulation metrics may also be filtered over time to improve the reliability of these metrics. The filtering may be selected based on a tradeoff between paging performance for the 1X system and data performance for the 1xEV-DO system.

When QPCH monitoring is enabled on the base station side, the terminal may monitor the QPCH if a channel estimator allows this monitoring to occur. If the channel estimator indicates that the 1X channel is bad and the terminal is operating in the simultaneous mode (with the secondary receiver on 1X), then the terminal should switch to the hybrid mode.

Figure 4:
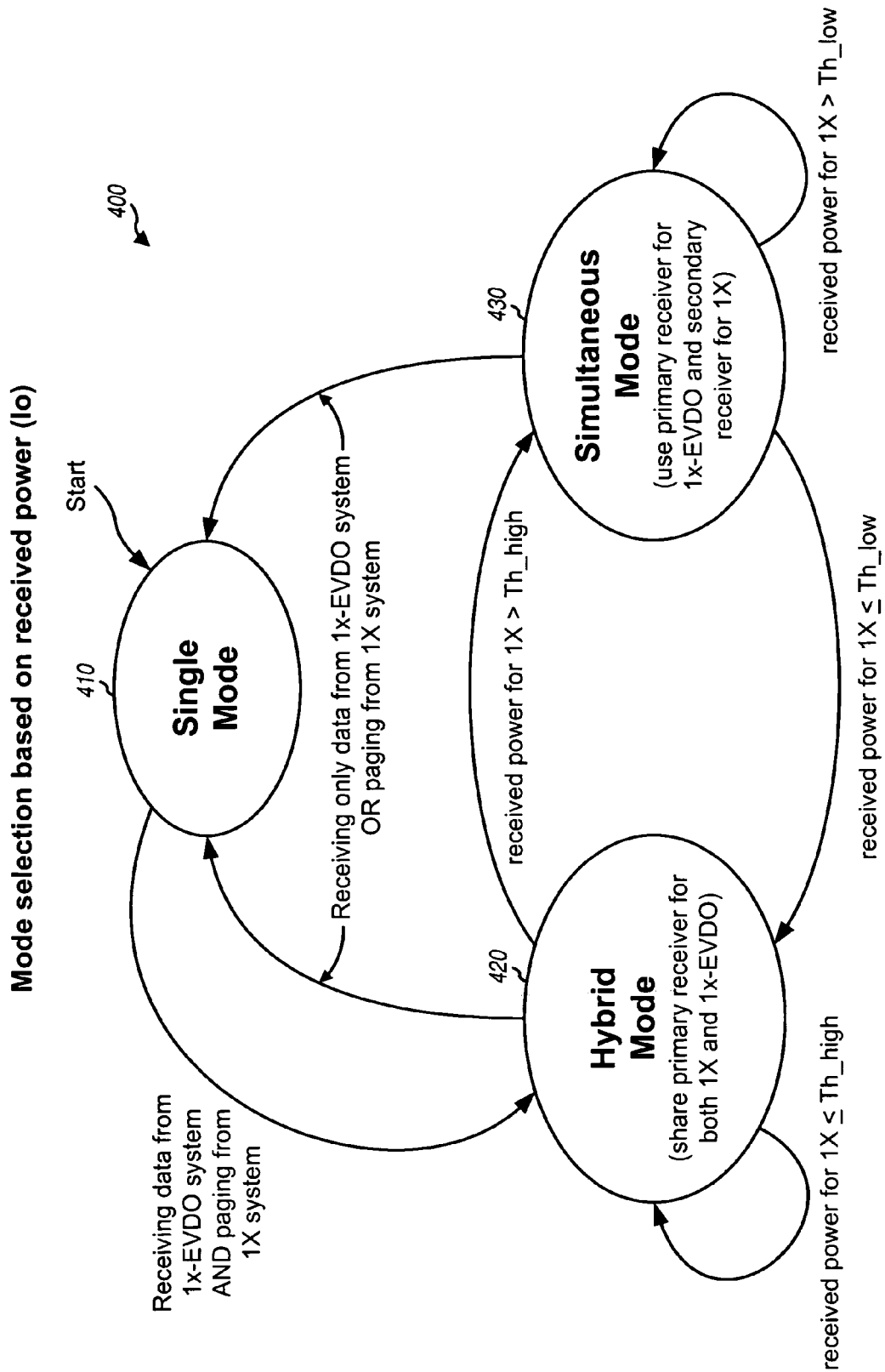
FIG. 4 shows a state diagram for selecting mode based on received power.

FIG. 4 shows an exemplary state diagram 400 for selecting mode based on received power (Io) for the 1X system. The terminal starts in a single mode 410 after accessing a system. In single mode 410, the terminal may receive from one system, which may be the 1X or 1xEV-DO system, using receiver 330a and/or 330b. The terminal transitions from single mode 410 to hybrid mode 420 (as shown in FIG. 4) or to simultaneous mode 430 (not shown in FIG. 4) upon accessing two systems, e.g., receiving data from the 1xEV-DO system and paging from the 1X system.

For the embodiment shown in FIG. 4, the terminal remains in hybrid mode 420 if the received power for the 1X system is less than or equal to a Th_high threshold. The terminal transitions from hybrid mode 420 to simultaneous mode 430 if the received power for the 1X system exceeds the Th_high threshold. The terminal remains in simultaneous mode 430 if the received power for the 1X system exceeds a Th_low threshold. The terminal transitions from simultaneous mode 430 to hybrid mode 420 if the received power for the 1X system is less than or equal to the Th_low threshold.

The Th_high and Th_low thresholds may be selected based on the design and performance of receivers 330a and 330b, the gains of antennas 312a and 312b, the desired paging performance for the 1X system, and/or other factors. In an embodiment, Th_high is higher than Th_low to provide hysteresis. For example, Th_high may be set to −85 dBm, Th_low may be set to −95 dBm, and the difference between the two thresholds may be 10 dBm. The hysteresis prevents the terminal from continually switching between the hybrid and simultaneous modes due to random fluctuations in the received power measurements for the 1X system. The fluctuations may result from noise and/or measurement uncertainty.

For the embodiment shown in FIG. 4, secondary receiver 330b is used to receive paging from the 1X system if the received power for the 1X system is sufficiently high. Under this scenario, receivers 330a and 330b may provide comparable paging performance, and the simultaneous mode may be selected so that primary receiver 330a may be used to achieve better data performance on both the forward and reverse links for the 1xEV-DO system. Primary receiver 330a is used to receive paging from the 1X system if the received power for the 1X system is not sufficiently high. Under this scenario, the hybrid mode may be selected so that primary receiver 330a may be used to provide better paging performance for the 1X system.

Figure 5:
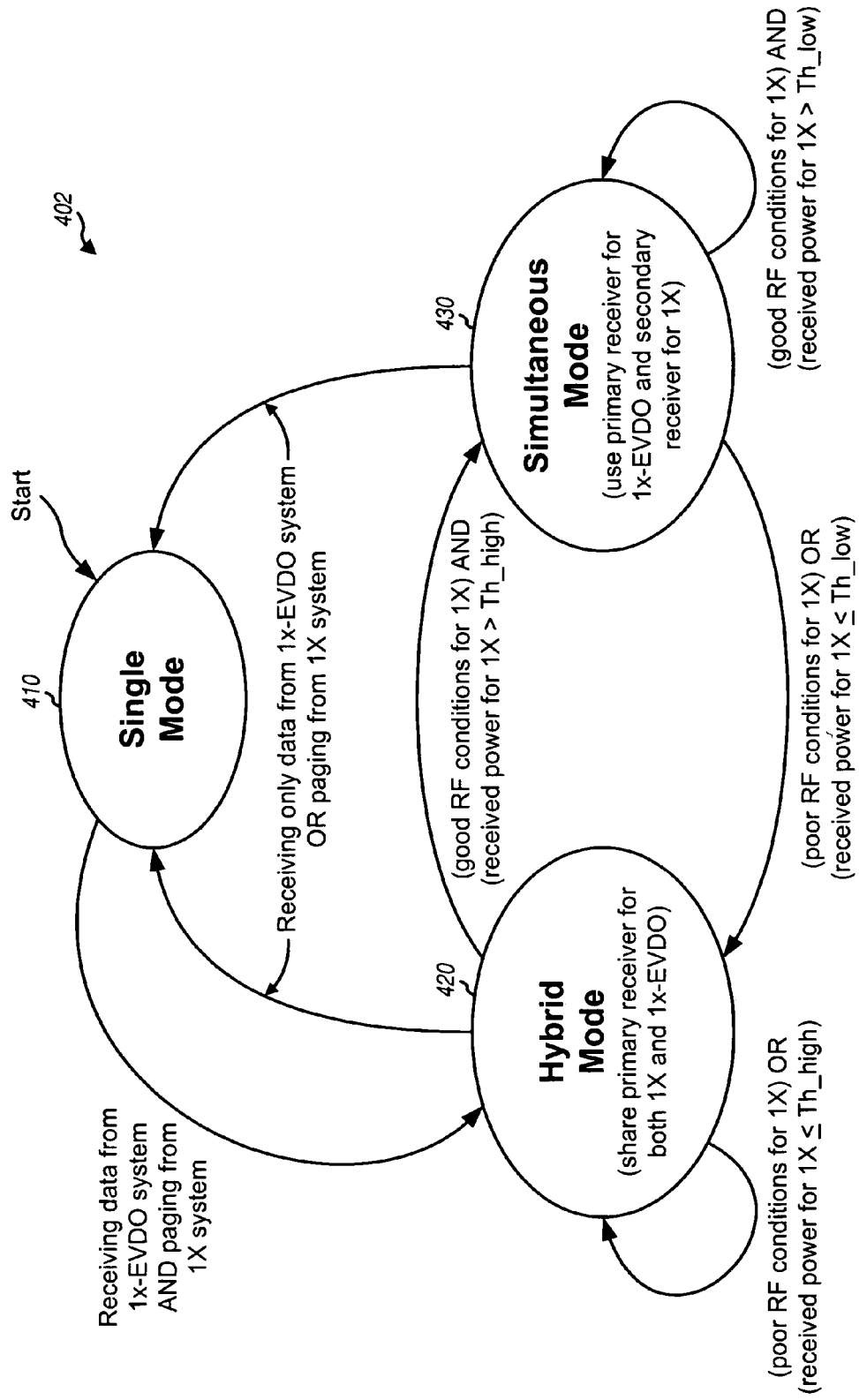
FIG. 5 shows a state diagram for selecting mode based on RF conditions and received power.

FIG. 5 shows an exemplary state diagram 402 for selecting mode based on RF conditions and received power (Io) for the 1X system. State diagram 402 includes all three modes 410, 420 and 430 described above for FIG. 4. For clarity, logical operations are denoted by capitalized words, e.g., OR and AND.

For the embodiment shown in FIG. 5, the terminal remains in hybrid mode 420 if the RF conditions for the 1X system are poor OR if the received power for the 1X system is less than or equal to the Th_high threshold. The terminal transitions from hybrid mode 420 to simultaneous mode 430 if the RF conditions for the 1X system are good AND the received power for the 1X system exceeds the Th_high threshold. The terminal remains in simultaneous mode 430 if the RF conditions for the 1X system remains good AND the received power for the 1X system exceeds the Th_low threshold. The terminal transitions from simultaneous mode 430 to hybrid mode 420 if the RF conditions for the 1X system are poor OR if the received power for the 1X system is less than or equal to the Th_low threshold.

For the embodiment shown in FIG. 5, the terminal operates in hybrid mode 420 if the RF conditions are poor. If the RF conditions are good, then the terminal switches between hybrid mode 420 and simultaneous mode 430 based on the received power for the 1X system and the Th_high and Th_low thresholds.

For the embodiment shown in FIG. 5, secondary receiver 330*b* is used to receiving paging from the 1X system if the RF conditions for the 1X system are good and the received power for the 1X system is sufficiently high. Under this scenario, receivers 330*a* and 330*b* may provide comparable paging performance, and the simultaneous mode may be selected so that primary receiver 330*a* may be used to achieve better data performance on both the forward and reverse links for the 1xEV-DO system. Primary receiver 330*a* may be used to receive paging from the 1X system if the RF conditions for the 1X system are poor or if the received power for the 1X system is not sufficiently high. Under these scenarios, the hybrid mode may be selected so that primary receiver 330*a* may be used to provide better paging performance for the 1X system.

The RF conditions for the 1X system may be ascertained based on the receiver that is tuned to the 1X system, e.g., using jammer detector 340 in FIGS. 3A and 3B. For some embodiments, jammer detector 340 only ascertains the RF conditions observed by primary receiver 330*a*. For these embodiments, the RF conditions for the 1X system and the RF conditions for the 1xEV-DO system may be (1) assumed to be similar if both systems are in the same band class and (2) ascertained by measuring the RF conditions observed by primary receiver 330*a*. If the two systems are in different band classes, then the RF conditions for the 1X system may be ascertained when primary receiver 330*a* tunes to the 1X system. In the hybrid mode, primary receiver 330*a* is used for both systems, and the RF conditions for the 1X system may be ascertained during the assigned paging slots. In the simultaneous mode, primary receiver 330*a* is used for the 1xEV-DO system, and the RF conditions for the 1X system may be ascertained by periodically switching primary receiver 330*a* to the 1X system, e.g., every Tm seconds, where Tm may be a static or configurable value.

Figure 6:
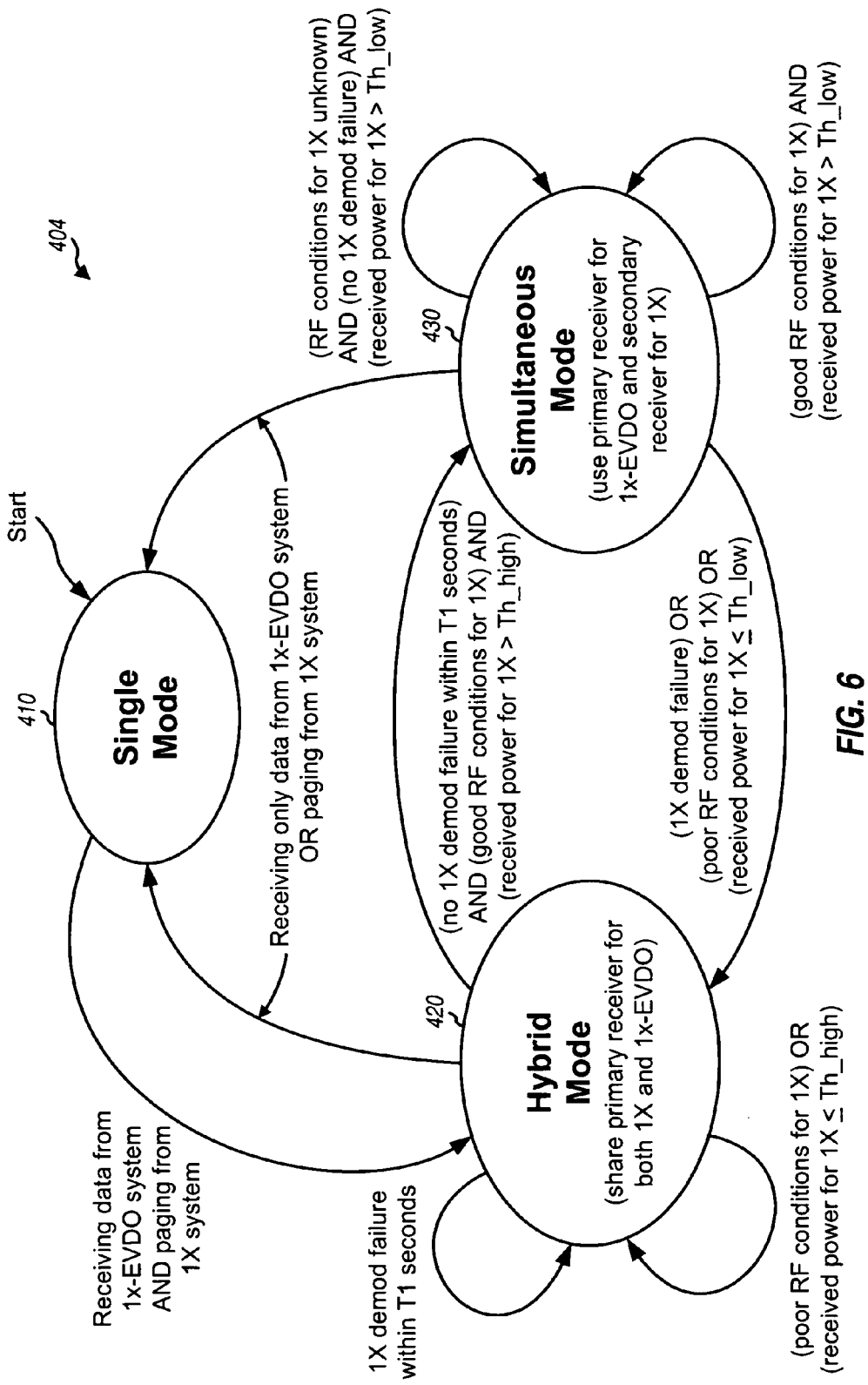
FIG. 6 shows a state diagram for selecting mode based on RF conditions, received power, and demodulation metric(s).

FIG. 6 shows an exemplary state diagram 404 for selecting mode based on RF conditions, received power (Io), and demodulation metric(s) for the 1X system. State diagram 404 includes modes 410, 420 and 430 described above for FIG. 4.

In the embodiment shown in FIG. 6, the terminal remains in hybrid mode 420 if (1) 1X demod failure was encountered within the last T1 seconds, OR (2) the RF conditions for the 1X system are poor, OR (3) the received power for the 1X system is less than or equal to the Th_high threshold. 1X demod failure may be declared if, for example, Eb/Nt is below an Eb/Nt threshold, the frame energy is below an energy threshold, the symbol error rate exceeds an SER threshold, the CRC fails, and so on. T1 may span one or more assigned paging slots and may be selected to achieve good paging performance.

The terminal transitions from hybrid mode 420 to simultaneous mode 430 if (1) 1X demod failure was not encountered in the last T1 seconds, AND (2) the RF conditions for the 1X system are good, AND (3) the received power for the 1X system exceeds the Th_high threshold. The terminal remains in simultaneous mode 430 if (1) the RF conditions for the 1X system are unknown, AND (2) 1X demod failure was not encountered in the last assigned paging slot, AND (3) the received power for the 1X system exceeds the Th_low threshold. The terminal also remains in simultaneous mode 430 if the RF conditions for the 1X system are good AND the received power for the 1X system exceeds the Th_low threshold. The terminal transitions from simultaneous mode 430 to hybrid mode 420 if (1) 1X demod failure was encountered in the last assigned paging slot, OR (2) the RF conditions for the 1X system are poor OR (3) the received power for the 1X system is less than or equal to the Th_low threshold.

For the embodiment shown in FIG. 6, the terminal remains in hybrid mode 420 if 1X demod failure was encountered within the last T1 seconds. This criterion may improve paging performance under certain operating environments. For example, the RF conditions for the 1X system may be good and the received power for the 1X system may be high and yet paging performance may be poor. The poor performance may result from the received power being high due to pilot pollution, which is a condition in which the received power for other base stations (Ioc) is much greater than the received power for the desired base station (Ior). Remaining in hybrid mode 420 in such operating environment may improve paging performance. T1 may be a static or configurable value.

FIGS. 4 through 6 show three embodiments for selecting mode based on RF conditions, received power, and demodulation metrics. The mode selection may also be performed based on other criteria and/or in other manners. For example, the hybrid mode may be selected for poor RF conditions and the simultaneous mode may be selected for good RF conditions. The RF conditions may be quantified with hysteresis to prevent toggling between the two modes.

For the embodiments shown in FIGS. 4 through 6, the mode selection is performed based solely on criteria for the 1X system. In other embodiments, the mode selection may be performed based on criteria for both the 1X and 1xEV-DO systems or just criteria for the 1xEV-DO system. Criteria applicable for both systems may include type of service such as broadcast versus normal two-way traffic. Criteria for the 1xEV-DO system may include RF conditions (e.g., whether receive diversity is requested for 1xEV-DO or whether the secondary receiver is turned off), received power, data rate, data performance, relative importance of data and paging, and so on for the 1xEV-DO system. For example, if receivers 330*a* and 330*b* provide similar 1xEV-DO data performance at low data rates, then the hybrid mode may be selected at low data rates without regard to the criteria for the 1X system.

For the embodiments shown in FIGS. 4 through 6, the terminal switches between the hybrid mode and the simultaneous mode if and when the switching criteria are satisfied. In another embodiment, after switching from the simultaneous mode to the hybrid mode, the terminal remains in the hybrid mode for at least T2 seconds to provide time hysteresis. T2 may be a static or configurable value and may be selected to provide good paging performance. For example, the operating environment may have degraded and triggered a switch from the simultaneous mode to the hybrid mode, and the terminal may have missed a page right at or just prior to this switch. T2 may be selected to cover the next page sent to the terminal.

In an embodiment, after a decision has been made to switch from the hybrid mode to the simultaneous mode, a search for pilots from the 1X system is made using secondary receiver 330*b*. This pilot search may be used to construct a reacquisition list that includes 1X base stations to which the terminal may be handed off in a subsequent assigned paging slot. This reacquisition list can improve performance for 1X handdown, which is a handoff from the 1xEV-DO system to the 1X system.

Figure 7:
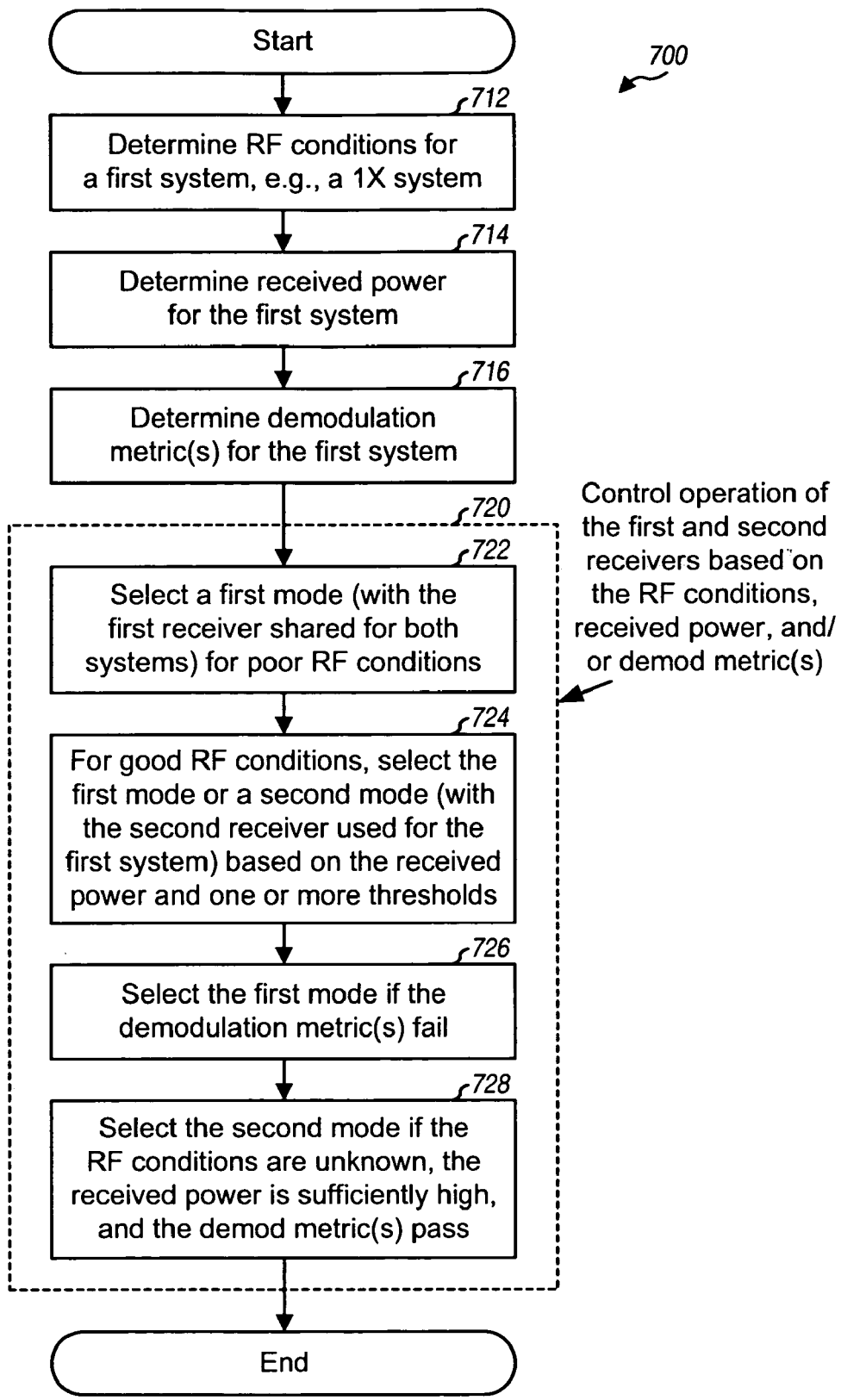
FIG. 7 shows a process for receiving data and paging from two systems.

FIG. 7 shows a process 700 performed by a terminal to receive from two systems. The RF conditions for a first system (e.g., a 1X system) are determined, for example, based on (1) RF measurements for the first system or (2) the RF conditions determined for a second system (e.g., a 1xEV-DO system) if the two systems are in the same frequency band (block 712). The received power for the first system may also be determined (block 714). One or more demodulation metrics for the first system may also be ascertained (block 716). Operation of the first/primary and second/secondary receivers is then controlled based on the RF conditions, received power, and/or demodulation metric(s) for the first system (block 720).

The first receiver may be associated with better performance than the second receiver. The first and second receivers are used to receive the first and second systems to achieve good performance for both systems. In a first/hybrid mode, the first receiver is used for both the first and second systems. In a second/simultaneous mode, the second receiver is used for the first system, and may also be used for the second system when not used for the first system.

In an embodiment, the operation of the first and second receivers is controlled based on received power for the first system, e.g., as shown in FIG. 4. For this embodiment, the first mode may be selected for low received power, and the second mode may be selected for high received power. In another embodiment, the operation of the first and second receivers is controlled based on RF conditions and received power for the first system, e.g., as shown in FIG. 5. For this embodiment, the first mode may be selected for poor RF conditions (block 722). For good RF conditions, the first or second mode may be selected based on the received power for the first system, e.g., using one or more thresholds (block 724). In yet another embodiment, the operation of the first and second receivers is controlled based on RF conditions, received power, and demodulation metric(s) for the first system, e.g., as shown in FIG. 6. For this embodiment, the first mode may further be selected if the demodulation metric(s) fail (block 726). The second mode may be further selected if the RF conditions are unknown, the received power is sufficiently high, and the demodulation metric(s) pass (block 728). The operation of the first and second receivers may also be controlled in other manners.

For the embodiments described above, the receivers are controlled such that good paging performance can be achieved for all operating environments. The mode selection may be made on various criteria (e.g., RF conditions, received power, and demodulation metrics) determined for the 1X system and/or the 1xEV-DO system.

For clarity, jammer detector 340 and control unit 342 in FIGS. 3A and 3B are shown as separate units. Jammer detector 340 and control unit 342 may also be implemented within processor 350 or controller 360. Control unit 342 may implement state diagram 400 in FIG. 4, state diagram 402 in FIG. 5, state diagram 404 in FIG. 6, and/or process 700 in FIG. 7.

The techniques described herein may be implemented by various means. For example, these techniques may be implemented in hardware, firmware, software, or a combination thereof. For a hardware implementation, the processing units used to perform mode selection may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the techniques may be implemented with modules (e.g., procedures, functions, and so on) that perform the functions described herein. The software codes may be stored in a memory (e.g., memory 362 in FIGS. 3A and 3B) and executed by a processor (e.g., processor 350 or controller 360). The memory may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
    at least one processor configured to determine radio frequency (RF) conditions for a first communication system, and to control operation of first and second receivers, wherein the first receiver is designed to meet a first performance metric and the second receiver is designed to meet a second performance metric, and wherein the second performance metric is less stringent than the first performance metric, based at least on the RF conditions for the first communication system, to receive the first communication system and a second communication system; and
    wherein the at least one processor is further configured to select one of multiple modes comprised of
    a first mode in which the first receiver is shared so as to receive the first system during designated time intervals and the second system at other times not equal to the designated time intervals, and
    a second mode in which the first receiver is used to receive the second system all the time and the second receiver is used to receive the first system during the designated time intervals, and wherein the first receiver is associated with better performance than the second receiver as determined by the first and second performance metrics.

2. The apparatus of claim 1, wherein the first and second receivers are configured to receive paging from the first system and to receive data from the second system.

3. The apparatus of claim 1, wherein the at least one processor is configured to determine received power for the first system and to control the operation of the first and second receivers based further on the received power for the first system.

4. The apparatus of claim 1, wherein the at least one processor is configured to determine at least one demodulation metric for the first system and to control the operation of the first and second receivers based further on the at least one demodulation metric.

5. The apparatus of claim 1, wherein the at least one processor is configured to determine at least one metric for the second communication system and to control the operation of the first and second receivers based further on the at least one metric for the second communication system.

6. The apparatus of claim 1, wherein the at least one processor is configured to select the first mode for poor RF conditions.

7. The apparatus of claim 1, wherein the at least one processor is configured to determine: received power for the first system, to select the first mode for poor RF conditions and, for good RF conditions, to select the first mode or the second mode based on the received power.

8. The apparatus of claim 7, wherein for good RF conditions the at least one processor is configured to select the first mode if the received power is below a first threshold and to select the second mode if the received power is above a second threshold that is higher than the first threshold.

9. The apparatus of claim 1, wherein the at least one processor is configured to determine at least one demodulation metric for the first system and to select one of the multiple modes based further on the at least one demodulation metric.

10. The apparatus of claim 9, wherein the at least one processor is configured to select the first mode if the at least one demodulation metric fails.

11. The apparatus of claim 9, wherein the at least one processor is configured to remain in the first mode if the at least one demodulation metric fails within a predetermined time period.

12. The apparatus of claim 9, wherein the at least one demodulation metric comprises energy-per-bit-to-total-noise ratio (Eb/Nt), frame energy, symbol error rate; cyclic redundancy check (CRC), or a combination thereof.

13. The apparatus of claim 1, wherein the at least one processor is configured to remain in the first mode for at least a predetermined time period after transitioning from the second mode to the first mode.

14. The apparatus of claim 1, wherein the at least one processor is configured to detect for large undesired signals in an RF input signal and to determine the RF conditions for the first system based on the large undesired signals, if any, detected in the RF input signal.

15. The apparatus of claim 1, wherein the at least one processor is configured to determine RF conditions for the second system based on RF measurements for the second system, and to use the RF conditions for the second system as the RF conditions for the first system if the first and second systems are in same band class.

16. The apparatus of claim 1, wherein the first receiver has better performance than the second receiver for poor RF conditions.

17. The apparatus of claim 1, wherein the first and second receivers are coupled to first and second antennas, respectively, and wherein the first antenna has higher gain than the second antenna.

18. The apparatus of claim 1, wherein the first system is a CDMA2000 1X system, and wherein the second system is a CDMA2000 1xEV-DO system.

19. A method comprising:
   determining radio frequency (RF) conditions for a first communication system; and
   controlling operation of first and second receivers, wherein the first receiver is designed to meet a first performance metric and the second receiver is designed to meet a second performance metric, and wherein the second performance metric is less stringent than the first performance metric, based at least on the RF conditions for the first communication system, to receive paging from the first communication system and data from a second communication system; and
   wherein controlling the operation of the first and second receivers further comprises selecting one of multiple modes comprised of
   a first mode in which the first receiver is shared so as to receive the first system during designated time intervals and the second system at other times not equal to the designated time intervals, and
   a second mode in which the first receiver is used to receive the second system all the time and the second receiver is used to receive the first system during the designated time intervals, and wherein the first receiver is associated with better performance than the second receiver as determined by the first and second performance metrics.

20. The method of claim 19, wherein the selecting one of multiple modes comprises selecting the first mode for poor RF conditions, and for good RF conditions, selecting the first mode or the second mode based on received power for the first system.

21. The method of claim 19, wherein the determining the RF conditions for the first system comprises detecting for large undesired signals in an RF input signal, and determining the RF conditions for the first system based on the large undesired signals; if any, detected in the RF input signal.

22. An apparatus comprising:
   means for determining radio frequency (RF) conditions for a first communication system; and
   means for controlling operation of first and second receivers, wherein the first receiver is designed to meet a first performance metric and the second receiver is designed to meet a second performance metric, and wherein the second performance metric is less stringent than the first performance metric, based at least on the RF conditions for the first communication system, to receive paging from the first communication system and data from a second communication system, and
   wherein the means for controlling the operation of the first and second receivers further comprises means for selecting one of multiple modes comprised of
   a first mode in which the first receiver is shared so as to receive the first system during designated time intervals and the second system at other times not equal to the designated time intervals, and
   a second mode in which the first receiver is used to receive the second system all the time and the second receiver is used to receive the first system during the designated time intervals, and wherein the first receiver is associated with better performance than the second receiver as determined by the first and second performance metrics.

23. The apparatus of claim 22, wherein the-means for selecting one of multiple modes comprises means for selecting the first mode for poor RF conditions, and means for selecting the first mode or the second mode based on received power for the first system, for good RF conditions.

24. The apparatus of claim 22, wherein the means for determining the RF conditions for the first system comprises means for detecting for large undesired signals in an RF input signal, and means for determining the RF conditions for the first system based on the large undesired signals, if any, detected in the RF input signal.

25. A computer program product comprising code stored in a memory, comprising:
   a first code for determining radio frequency (RF) conditions for a first communication system;
   a second code for controlling operation of first and second receivers, wherein the first receiver is designed to meet a first performance metric and the second receiver is designed to meet a second performance metric, and wherein the second performance metric is less stringent than the first performance metric, based at least on the RF conditions for the first communication system, to receive paging from the first communication system and data from a second communication system; and
   a third code for selecting one of multiple modes comprised of
   a first mode in which the first receiver is shared so as to receive the first system during designated time intervals and the second system at other times not equal to the designated time intervals, and
   a second mode in which the first receiver is used to receive the second system all the time and the second receiver is used to receive the first system during the designated time intervals, and wherein the first receiver is associated with better performance than the second receiver as determined by the first and second performance metrics.

26. An apparatus comprising:
at least one processor configured to determine received power for a first communication system, and to control operation of first and second receivers, wherein the first receiver is designed to meet a first performance metric and the second receiver is designed to meet a second performance metric, and wherein the second performance metric is less stringent than the first performance metric, based at least on the received power for the first communication system, to receive paging from the first communication system and data from a second communication system; and
wherein the at least one processor is further configured to select one of multiple modes comprised of
a first mode in which the first receiver is shared so as to receive the first system during designated time intervals and the second system at other times not equal to the designated time intervals, and
a second mode in which the first receiver is used to receive the second system all the time and the second receiver is used to receive the first system during the designated time intervals, and wherein the first receiver is associated with better performance than the second receiver as determined by the first and second performance metrics.

27. The apparatus of claim 26, wherein the at least one processor is configured to transition from the first mode to the second mode if the received power exceeds a first threshold, and to transition from the second mode to the first mode if the received power is below a second threshold that is lower than the first threshold.

28. The apparatus of claim 1, wherein the first performance metric and the second performance metric includes receiver sensitivity, dynamic range, linearity, out-of-band rejection or a combination thereof.

29. The method of claim 19, wherein the first performance metric and the second performance metric includes receiver sensitivity, dynamic range, linearity, out-of-band rejection or a combination thereof.

30. The apparatus of claim 22, wherein the first performance metric and the second performance metric includes receiver sensitivity, dynamic range, linearity, out-of-band rejection or a combination thereof.

31. The computer program product of claim 25, wherein the first performance metric and the second performance metric includes receiver sensitivity, dynamic range, linearity, out-of-band rejection or a combination thereof.

32. The apparatus of claim 26, wherein the first performance metric and the second performance metric includes receiver sensitivity, dynamic range, linearity, out-of-band rejection or a combination thereof.

33. The method of claim 19, wherein the first receiver is coupled to a first antenna and the second receiver is coupled to a second antenna.

34. The apparatus of claim 22, wherein the first receiver is coupled to a first antenna and the second receiver is coupled to a second antenna.

35. The computer program product of claim 25, wherein the first receiver is coupled to a first antenna and the second receiver is coupled to a second antenna.

36. The apparatus of claim 26, wherein the first receiver is coupled to a first antenna and the second receiver is coupled to a second antenna.

* * * * *